United States Patent
Tenny et al.

(10) Patent No.: US 10,237,897 B2
(45) Date of Patent: Mar. 19, 2019

(54) SYSTEM AND METHOD FOR RELAY DEVICE DISCOVERY

(71) Applicant: Futurewei Technologies, Inc., Plano, TX (US)

(72) Inventors: Nathan Edward Tenny, Poway, CA (US); Guorong Li, Beijing (CN)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 18 days.

(21) Appl. No.: 15/483,367

(22) Filed: Apr. 10, 2017

(65) Prior Publication Data

US 2017/0332425 A1 Nov. 16, 2017

Related U.S. Application Data

(60) Provisional application No. 62/334,726, filed on May 11, 2016.

(51) Int. Cl.
*H04W 74/08* (2009.01)
*H04W 8/00* (2009.01)
*H04W 76/14* (2018.01)
*H04W 88/04* (2009.01)

(52) U.S. Cl.
CPC ....... *H04W 74/0833* (2013.01); *H04W 8/005* (2013.01); *H04W 76/14* (2018.02); *H04W 74/08* (2013.01); *H04W 88/04* (2013.01)

(58) Field of Classification Search
CPC . H04W 74/0833; H04W 88/04; H04W 74/08; H04W 76/10; H04W 76/14; H04W 8/005

USPC .......................................................... 370/329
See application file for complete search history.

(56) References Cited

U.S. PATENT DOCUMENTS

| 9,264,956 | B2* | 2/2016 | Kim | H04W 36/0055 |
| 2012/0082088 | A1* | 4/2012 | Dalsgaard | H04L 12/4625 370/315 |
| 2012/0142336 | A1* | 6/2012 | Van Phan | H04W 36/0033 455/423 |

(Continued)

FOREIGN PATENT DOCUMENTS

| CN | 101389121 A | 3/2009 |
| CN | 101394665 A | 3/2009 |

(Continued)

OTHER PUBLICATIONS

"3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321 V8.2.0, May 2008, 33 pages.

*Primary Examiner* — Rownak Islam
(74) *Attorney, Agent, or Firm* — Slater Matsil, LLP

(57) ABSTRACT

A method for establishing relay services includes transmitting a random access parameter to a network node indicating a request for relaying services, the transmitting of the random access parameter initiates a first random access procedure, receiving, by the RD, a random access response including a relay indicator indicating one or more candidate relay devices, wherein receiving the relay indicator terminates the first random access procedure, and searching for a relay device in accordance with the relay indicator included in the random access response.

18 Claims, 9 Drawing Sheets

(56) References Cited

U.S. PATENT DOCUMENTS

| | | | | |
|---|---|---|---|---|
| 2014/0241237 A1* | 8/2014 | Speight | ............... | H04W 52/46 |
| | | | | 370/315 |
| 2016/0088668 A1* | 3/2016 | Kim | ............... | H04W 76/023 |
| | | | | 370/315 |
| 2016/0234861 A1* | 8/2016 | Ye | ............... | H04W 74/0808 |
| 2016/0262086 A1* | 9/2016 | Bodas | ............... | H04B 7/15 |
| 2016/0295494 A1* | 10/2016 | Gulati | ............... | H04W 40/22 |
| 2018/0152986 A1* | 5/2018 | Jung | ............... | H04W 76/30 |

FOREIGN PATENT DOCUMENTS

| | | | |
|---|---|---|---|
| CN | 102474878 | A | 5/2012 |
| WO | 2011020211 | A1 | 2/2011 |
| WO | 2016008657 | A1 | 1/2016 |

* cited by examiner

SYSTEM AND METHOD FOR RELAY DEVICE DISCOVERY

This application claims the benefit of U.S. Provisional Application No. 62/334,726, filed on May 11, 2016, entitled "System and Method for Relay Device Discovery," which application is hereby incorporated herein by reference.

TECHNICAL FIELD

The present disclosure relates generally to a system and method for digital communications, and, in particular embodiments, to a system and method for relay device discovery.

BACKGROUND

Remote devices (RDs) are typically objects with embedded electronics, software, sensors, as well as connectivity that enable the objects to exchange information with an operator, a manufacturer, a user, and/or other connected objects. Some remote devices may be small and battery powered. As an example, remote devices used in sensing operations (e.g., weather, fire, security, health, automotive, and so on) are expected to operate for years without battery replacement or user intervention.

Although the remote devices are capable of wireless connections, their connectivity may be restricted to short range technologies, such as PC5, BlueTooth (BT), device-to-device (D2D), Proximity Services (ProSe), and so on, in order to help minimize power consumption. Even for remote devices that are capable of longer range communication, it is desirable to use short range technologies instead if possible, because communicating using such technologies typically consume less power than long range technologies. Therefore, in order to communicate with remotely located devices and/or services, while still providing the remote devices with communications towards an operator's network (for instance, a cellular network), an intermediary device is needed to relay communications to and from the remote devices. The intermediary device may be referred to as a relay device, a relay UE, or simply a relay.

SUMMARY

Example embodiments provide a system and method for relay device discovery.

In accordance with an example embodiment, a method for establishing relay services is provided. The method includes transmitting, by a remote device (RD), a random access parameter to a network node indicating a request for relaying services, wherein the transmitting of the random access parameter initiates a first random access procedure, receiving, by the RD, a random access response (RAR) including a relay indicator indicating one or more candidate relay devices, wherein receiving the relay indicator terminates the first random access procedure, and searching, by the RD, for a relay device in accordance with the relay indicator included in the RAR.

The method also includes initiating, by the RD, a second random access procedure to request a direct connection with the network node when the searching for the relay device fails. The relay indicator includes an indicator of a number of candidate relay devices and identifiers associated with the candidate relay devices. The random access parameter is transmitted in an initial message of the first random access procedure.

The random access parameter is a random access preamble. The random access preamble is selected from a plurality of relaying random access preambles. The random access parameter is a dedicated random access preamble assigned to the RD.

In accordance with an example embodiment, a method for establishing relay services is provided. The method includes receiving, by an access node, a random access parameter from a RD indicating a request for relaying services, wherein the receiving of the random access parameter from the RD initiates a random access procedure, and transmitting, by the access node, a RAR including a relay indication indicating one or more candidate relay devices, wherein the transmitting of the RAR terminates the random access procedure.

The method also includes selecting, by the access node, at least one candidate relay device in accordance with geographical information associated with the RD, wherein the relay indication indicates the at least one candidate relay device. The relay indication indicates at least one identifier of the one or more candidate relay devices. The method also includes assigning, by the access node, a dedicated random access preamble to the RD, wherein the random access parameter comprises the dedicated random access preamble. The random access parameter is received in an initial message of the random access procedure.

In accordance with an example embodiment, a RD adapted to establish relay services is provided. The RD includes one or more processors, and a computer readable storage medium storing programming for execution by the one or more processors. The programming including instructions to configure the RD to transmit a random access parameter to a network node indicating a request for relaying services, wherein the transmitting of the random access parameter initiates a first random access procedure, receive a RAR including a relay indicator indicating one or more candidate relay devices, wherein receiving the relay indicator terminates the first random access procedure, and search for a relay device in accordance with the relay indicator included in the RAR.

The programming includes instructions to configure the RD to initiate a second random access procedure to request a direct connection with the network node when the searching for the relay device fails. The relay indicator comprises an indicator of a number of candidate relay devices and identifiers associated with the candidate relay devices. The random access parameter is transmitted in an initial message of the first random access procedure.

In accordance with an example embodiment, an access node adapted to establish relay services is provided. The access node includes one or more processors, and a computer readable storage medium storing programming for execution by the one or more processors. The programming including instructions to configure the access node to receive a random access parameter from a RD indicating a request for relaying services, wherein the receiving of the random access parameter from the RD initiates a random access procedure, and transmit a RAR including a relay indication indicating one or more candidate relay devices, wherein the transmitting of the RAR terminates the random access procedure.

The programming includes instructions to configure the access node to select at least one candidate relay device in accordance with geographical information associated with the RD, wherein the relay indication indicates the at least one candidate relay device. The programming includes instructions to configure the access node to assign a dedicated random access preamble to the RD, wherein the random access parameter comprises the dedicated random access preamble. The random access parameter is received in an initial message of the random access procedure.

Practice of the foregoing embodiments helps a remote device search for relay devices by providing information helpful in the search for relay devices. The information helps to reduce the search for suitable relay devices.

Practice of the foregoing embodiments enables a remote device to terminate a random access procedure early when attempting to establish relay services, thereby achieving a reduction in power consumption by eliminating transmissions over high power communications links.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
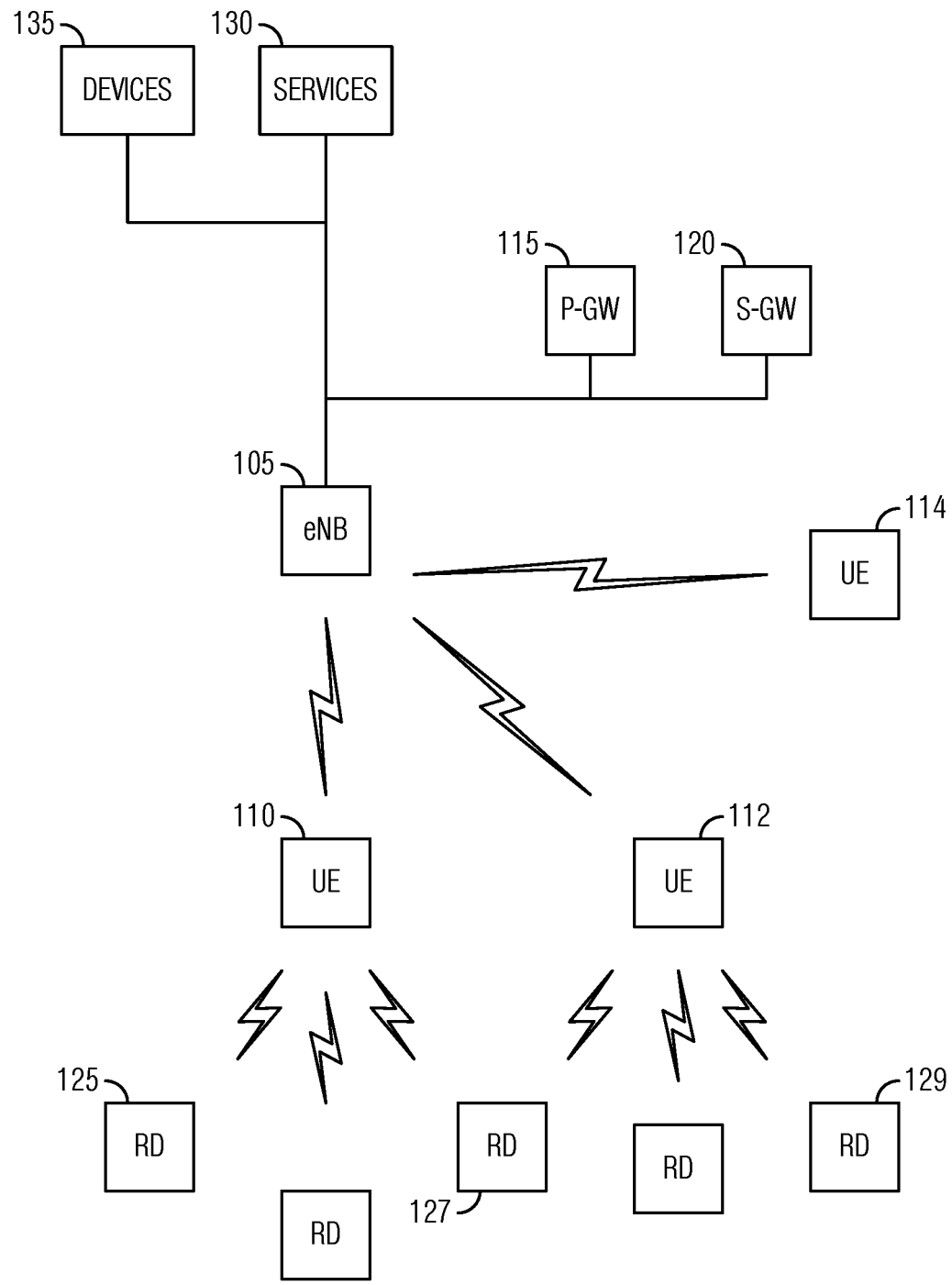
FIG. 1 illustrates an example wireless communications system according to example embodiments presented herein.

FIG. 1 illustrates an example wireless communications system 100. Wireless communications system 100 includes a communications controller, such as an evolved Node B (eNB) 105 serving a plurality of communications devices, such as user equipments (UEs), including UE 110, UE 112, and UE 114. In a cellular operating mode, communications to and from the plurality of UEs go through eNB 105, while in machine to machine communications mode, such as proximity services (ProSe) operating mode, for example, direct communication between UEs is possible. Communications controllers may also be commonly referred to as Node Bs, controllers, base stations, access points, and so on, while communications devices may also be commonly referred to as mobile stations, mobiles, terminals, users, subscribers, stations, and the like. Communications from an eNB to a UE are commonly referred to as downlink communications, while communications from a UE to an eNB are commonly referred to as uplink communications.

Wireless communications system 100 also includes network entities such as a packet data network gateway (PDN gateway or P-GW) 115 that provides interconnectivity between networks, and a serving gateway (S-GW) 120 that provides entry and egress points for packets intended for users. Wireless communications system 100 also includes a plurality of remote devices (RDs), such as RD 125, RD 127, and RD 129. The RDs are connected to UEs serving as relays. The plurality of RDs may include, but are not limited to, sensor devices, wearable devices, smart appliances, and so on. While it is understood that communications systems may employ multiple eNBs capable of communicating with a number of UEs and RDs, only one eNB, three UEs, and five RDs are illustrated for simplicity.

As discussed previously, the RDs typically have limited connectivity options in terms of range. As an example, due to power consumption considerations, it is likely that many RDs will not have medium to long range wireless connectivity, such as 3GPP LTE, longer-range IEEE 802.11 WiFi technologies, code division multiple access (CDMA), and the like, connectivity. Further, even RDs that do support a longer range communications technology may experience degraded link budgets compared to typical longer-range devices such as smartphones, due to restrictions on power consumption and/or radio performance. In addition, communicating over a longer-range wireless technology typically consumes more battery power than a short range technology. Therefore, UEs in a wireless communications system may serve as relays to relay communications to and from the RDs. UEs may connect to RDs over short range connectivity, such as PC5, BlueTooth, ProSe, shorter-range IEEE 802.11 WiFi technologies, D2D, and so on, connections, and forward packets between the RDs and remotely located services and/or devices. The UEs providing relay services may be referred to as relay UEs. As an illustrative example, UE 110 serves as a relay for RD 125 and RD 127, while UE 112 serves as a relay for RD 127 and RD 129, providing connectivity between the RDs and remotely located services 130 and/or devices 135 by way of eNB 105.

A relay UE may provide relay services for one or more RDs, receiving packets from the RDs and forwarding the received packets to the eNB serving the relay UE or receiving packets from the eNB serving the UE and forwarding the received packets to respective RDs. The number of RDs supported by a single relay UE may grow quickly. As an example, a relay UE is expected to relay packets for RDs owned by the owner of the UE, including a smart watch, smart glasses, a fitness or activity tracker, and so on. The relay UE may also relay packets for other RDs that it may encounter throughout the day. The relay UE may use a separate data radio bearer (DRB) for each RD. Alternatively, communications for different RDs may be differentiated by the relay UE according to rules embodied in various protocol layers.

Figure 2:
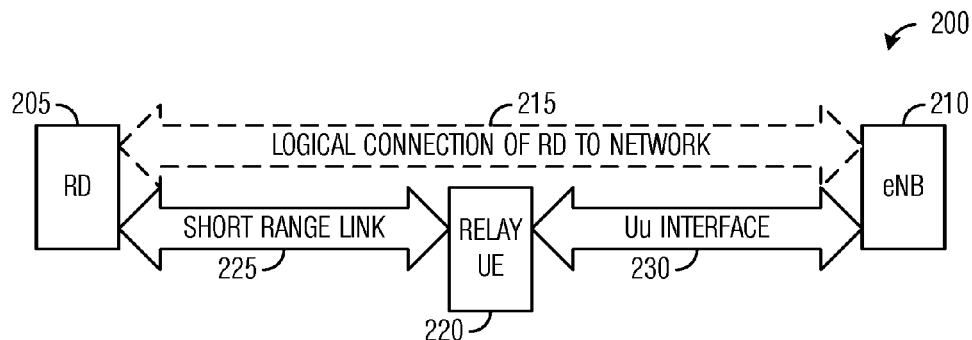
FIG. 2 illustrates a diagram highlighting connectivity between an RD and an eNB.

FIG. 2 illustrates a diagram 200 highlighting connectivity between an RD and an eNB. FIG. 2 illustrates a logical connection 215 between an RD 205 and an eNB 210. As discussed previously, RDs are typically small and battery powered, so battery life is an important consideration. One way to help reduce power consumption at an RD is to utilize short range links and relay UEs, such as relay UE 220. RD 205 is connected to relay UE 220 via a short range link 225 and relay UE 220 is connected to eNB 210 via a radio interface 230, such as a 3GPP Uu interface, for example. Short range link 225 is a low power link so RD 205 is able to minimize power consumption while communicating, while radio interface 230 is a longer range radio technology to help increase usable range for devices that can afford to use greater power while communicating.

In order to establish relayed communications with an eNB, the RD needs to discover that the relay UE is in proximity, e.g., within range of a short range communications technology. The example embodiments presented herein are related to situations wherein the RD has longer range radio support and is able to communicate with the eNB. However, due to battery life considerations, the RD attempts to utilize relayed communications as soon as possible. Furthermore, a network entity in the communications system controls the relaying connection. In other words, a network entity in the communications system may be asked to allow relay operations for the relay UE and the RD. The network entity may be a communications controller directly serving the relay UE or a controller of the communications controller, for example.

A prior art technique may include:
  The RD performs a random access (RACH) procedure to connect to the communications system as an ordinary UE;
  The eNB provides the RD (operating as an ordinary UE) with measurement information (such as 3GPP LTE sidelink measurements) to help the RD discover a relay UE;
  The RD makes measurements in accordance with the measurement information provided by the eNB;
  If the RD finds a potential relay UE, the RD reports the potential relay UE to the eNB; and
  The eNB triggers a transfer (such as a handover) to move the RD from the eNB to the relay UE.

According to an example embodiment, the search for the relay UE occurs without completing the connection setup, e.g., before sending or receiving the final messages of the RACH procedure. During the connection setup procedure, the RD may be provided with information to help find a relay UE. The providing of the information to help find a relay UE during the connection setup helps to setup a connection with the relay UE earlier, thereby reducing the amount of communications the RD has to perform using the longer range radio and increasing the battery life of the RD, as well as reducing the number of messages sent on common channels on the longer range link, which may be beneficial by reducing interference and/or increasing capacity of the common channels.

According to an example embodiment, the eNB provides information and/or parameters to help the RD search for a relay UE during the connection setup. As an illustrative example, the UE provides the information and/or the parameters to help the RD search for a relay UE in a RACH response message.

Figure 3:
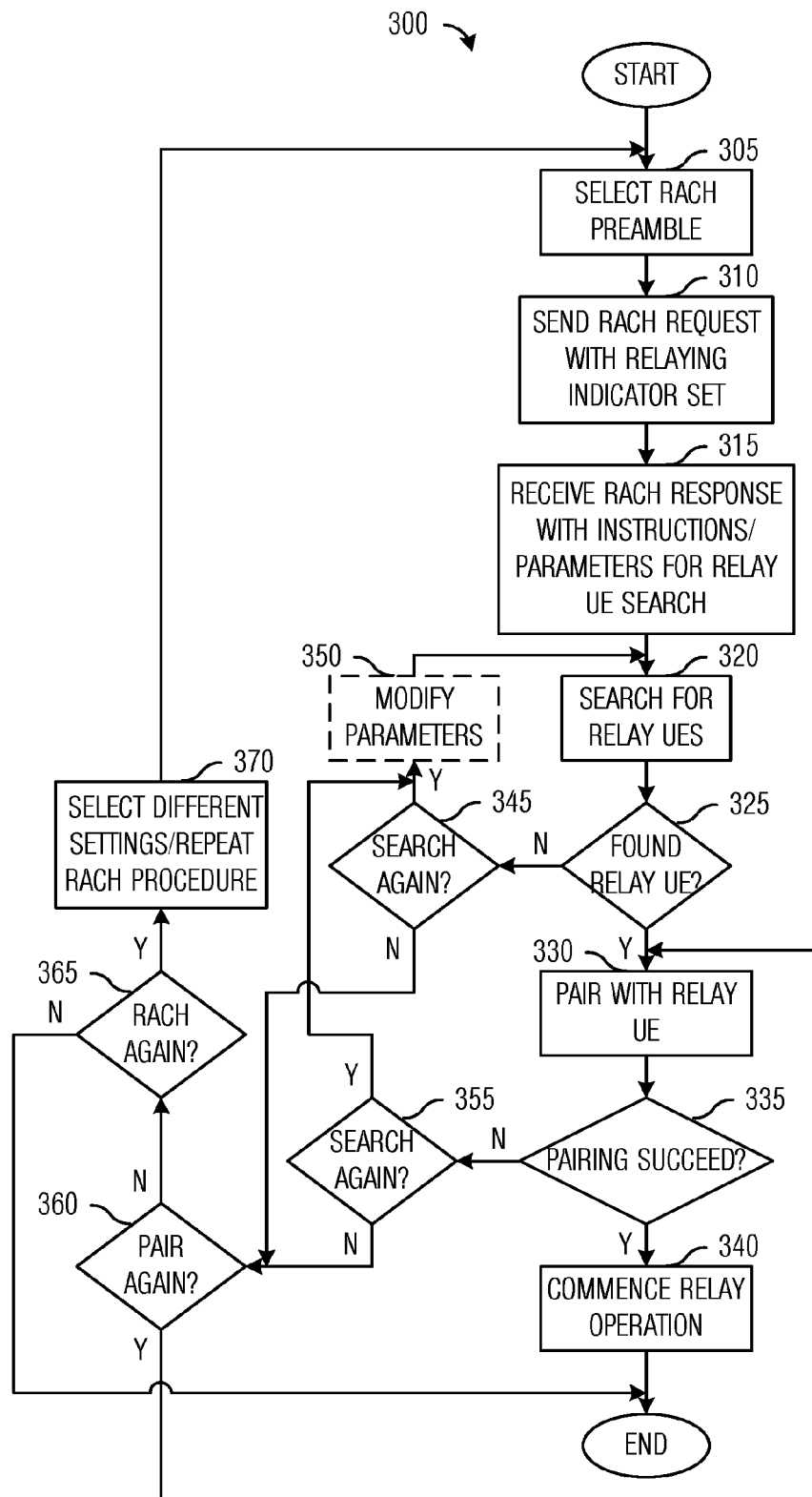
FIG. 3 illustrates a flow diagram of example operations occurring in a RD attempting to setup a relay connection according to example embodiments presented herein.

FIG. 3 illustrates a flow diagram of example operations 300 occurring in a RD attempting to setup a relay connection. Operations 300 may be indicative of operations occurring in a RD as the RD attempts to setup a relay operation.

Operations 300 begin with the RD selecting a RACH preamble (block 305). The RD may randomly select a RACH preamble from a set of available RACH preambles. The set of available RACH preambles may comprise a plurality of groups of preambles, e.g., a first group of preambles used by multiple UEs for contention-based access, a second group of dedicated preambles that may be allocated by the system to an individual UE for contention-free access, a third group that may be used by UEs to indicate a required grant size, and so on. The RD sends a RACH request with the RACH preamble and with a relaying indicator set (block 310). The RACH request may be sent to an eNB over a longer range radio connection. The relaying indicator may be a 2 valued indicator contained in the RACH request, which when set to a first value (e.g., "1") indicates that the RD wants relaying service and when set to a second value (e.g., "0") indicates that the RD does not want relaying service (or is not specifying that it wants relaying service). Alternatively, the RD selects the RACH preamble from a group of relaying RACH preambles, which may be an additional group of the plurality of groups of preambles discussed previously, wherein a RACH request that includes a relaying RACH preamble implicitly indicates that the RD wants relaying service and a RACH request that does not include a relaying RACH preamble implicitly indicates that the RD does not want relaying service. Alternatively, the RACH request is sent in relay-specific RACH radio resources, which implicitly indicates that the RD wants relaying service. If the RACH request is not sent in the relay-specific RACH radio resources, it is implicitly indicated that the RD does not want relaying services. The relay-specific RACH radio resources may be indicated to the RD in system information, such as a system information block (SIB). The relay-specific RACH radio resources may be differentiated from other RACH radio resources in one or more of various orthogonal or pseudo-orthogonal dimensions, e.g., time, frequency, code selection, power level, etc.

The RD receives a RACH response (block 315). The RACH response may be commonly referred to as a random access response (RAR). The RACH response may be received from the eNB that was sent the RACH request. The RACH response includes instructions and/or parameters for the relay UE search. The RACH response includes a backoff indicator (BI) subheader in a new format, which is described in detail below. The new BI subheader format includes a relay indicator to indicate that the RACH response includes the instructions and/or parameters. As an illustrative example, the instructions and/or parameters includes one or more of the following: identifiers of UEs that are in the vicinity of the RD; identifiers of UEs willing to provide relay services; identifiers of UEs that are in the vicinity of the RD that are willing to provide relay services; identifiers of UEs not willing to provide relay services; directional information regarding which direction to search for UEs; directional information regarding which direction to avoid when searching for UEs; and so on. Because the eNB does not typically know the identity of the RD at the point in the RACH procedure when the RACH response is sent, the eNB may not be able to provide RD specific information.

The RD searches for relay UEs (block 320). As an illustrative example, the RD searches for transmissions made by UEs to identify potential relay UEs that are in the vicinity of the RD. As another illustrative example, the RD searches for reference signals transmitted by the UEs to identify the potential relay UEs that are in the vicinity of the RD. The RD makes measurements of the transmissions made by the potential relay UEs. As an illustrative example, the RD may infer that a potential relay UE is in the vicinity of the RD based on the signal strength of the measured signals exceeding a threshold. The process of searching and/or measuring may identify certain UEs as being active in the vicinity of the RD, using a short range wireless technology, but may not be able to determine which UEs are offering relay services, or which are available to serve the particular RD as a relay UE.

The RD performs a check to determine if any relay UEs have been found (block 325). If the RD has found one or more relay UEs, the RD attempts to pair with one of the one or more relay UEs (block 330). As an illustrative example, the RD selects a relay UE based on measurements made of the transmissions from the relay UEs. The RD selects the relay UE with the strongest measurement, for example. Alternatively, the UE uses the information and/or parameters provided by the eNB to select the relay UE. As an illustrative example, the RD selects a relay UE that does not have the strongest measurement if the relay UE selected is indicated by the eNB as a relay UE that is willing to provide relay services, while the relay UE with the strongest measurement is not indicated to be willing to provide relay services. The RD performs a check to determine if the pairing with one of the one or more relay UEs was successful (block 335). If the RD found more than one relay UE, the RD may repeat the pairing attempts until a pairing attempt is successful or until a pairing has been attempted with all detected relay UEs. If the RD was successful in pairing with a relay UE, the RD commences relay operations with the relay UE and the eNB (block 340).

If the RD was unable to find any relay UEs (block 325), the RD performs a check to determine whether or not to try the search again (block 345). If the RD determines to search again for relay UEs, the RD returns to block 320 to repeat the search for relay UEs. The RD may modify parameters of the search before repeating the search (block 350). As an illustrative example, if the information and/or parameters provided by the eNB include directional information, the RD may choose to ignore the directional information in the search. As another illustrative example, if the information and/or parameters provided by the eNB include identifier information, the RD may elect to search for relay UEs that are not identified in the information and/or parameters provided by the eNB. As an illustrative example, the RD ignores some or all of the instructions and/or parameters provided by the eNB. As another illustrative example, the RD applies only a subset of the instructions and/or parameters provided by the eNB.

If the RD was not able to pair successfully with any relay UEs and establish a relaying service (block 335), the RD performs a check to determine if the RD should search again for relay UEs (block 355). If the RD determines that it should try again to search for relay UEs, the RD returns to block 320 to search for relay UEs. The RD may modify the information and/or parameters provided by the eNB to change the search for relay UEs (block 350). As an illustrative example, if the information and/or parameters provided by the eNB include directional information, the RD may choose to ignore the directional information in the search. As another illustrative example, if the information and/or parameters provided by the eNB include identifier information, the RD may elect to search for relay UEs that are not identified in the information and/or parameters provided by the eNB. As an illustrative example, the RD ignores some or all of the instructions and/or parameters provided by the eNB. As another illustrative example, the RD applies only a subset of the instructions and/or parameters provided by the eNB.

If the RD does not search again for relay UEs (blocks 345 or 355), the RD performs a check to determine if the RD should try again to pair with the relay UEs (block 360). In some situations, a pairing procedure may fail, even if the RD and the relay UE are suitable for pairing. Repeating the pairing procedure at a later time may result in successful pairing. If the RD does not want to repeat the pairing procedure with the relay UEs, the RD performs a check to determine if the RD should repeat the RACH procedure to setup relay operations (block 365).

If the RD should try the RACH procedure again, the RD selects different settings and returns to block 305 to repeat the RACH procedure (block 370). As an illustrative example, the RD selects a RACH preamble that explicitly or implicitly states that the RD is not looking for relaying service or the RD sends a RACH request with the relaying indicator set to indicate that the RD is not looking for relaying service. If the RD should not try the RACH procedure again, operations 300 terminate.

In a first aspect, the present application provides a method for establishing relay services. The method includes transmitting, by a RD, a random access parameter to a network node indicating a request for relaying services, wherein the transmitting of the random access parameter initiates a first random access procedure, receiving, by the RD, a RAR including a relay indicator indicating one or more candidate relay devices, wherein receiving the relay indicator terminates the first random access procedure, and searching, by the RD, for a relay device in accordance with the relay indicator included in the RAR.

According to a first embodiment of the method according to the first aspect, the method includes initiating, by the RD, a second random access procedure to request a direct connection with the network node when the searching for the relay device fails. According to a second embodiment of the method according to any preceding embodiment of the first aspect or the first aspect as such, the relay indicator includes an indicator of a number of candidate relay devices and identifiers associated with the candidate relay devices. According to a third embodiment of the method according to any preceding embodiment of the first aspect or the first aspect as such, the random access parameter is transmitted in an initial message of the first random access procedure.

According to a fourth embodiment of the method according to any preceding embodiment of the first aspect or the first aspect as such, the random access parameter is a random access preamble. According to a fifth embodiment of the method according to any preceding embodiment of the first aspect or the first aspect as such, the random access preamble is selected from a plurality of relaying random access preambles. According to a sixth embodiment of the method according to any preceding embodiment of the first aspect or the first aspect as such, the random access parameter is a dedicated random access preamble assigned to the RD.

According to an example embodiment, a medium access control (MAC) subheader is defined to support the sending of the instructions and/or parameters in the RACH response while maintaining compatibility with legacy UEs.

Figure 4A:
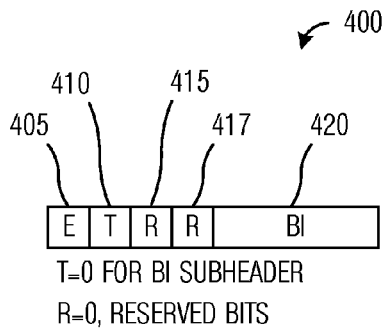
FIG. 4A illustrates a legacy BI subheader.

FIG. 4A illustrates a legacy BI subheader 400. Legacy BI subheader 400 includes an extension ("E") field 405, a type ("T") field 410, two reserved ("R") fields 415 and 417, and a BI field 420. E field 405 indicates if more fields are present in the MAC header and T field 410 indicates if the MAC subheader includes a random access identifier or a BI. As an example, if T field 410 is set to 0, the MAC subheader includes a BI.

Figure 4B:
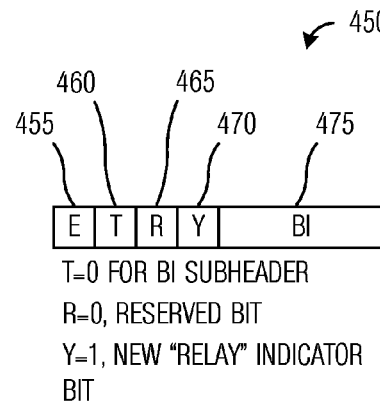
FIG. 4B illustrates a new BI subheader with an indicator of relay operation according to example embodiments presented herein.

FIG. 4B illustrates a new BI subheader 450 with an indicator of relay operation. New BI subheader 400 includes an E field 455, a T field 460, an R field 465, a relay ("Y") field 470, and a BI field 475. E field 455 indicates if more fields are present in the MAC header and T field 460 indicates if the MAC subheader includes a random access identifier or a BI. Y field 470 indicates if a message including the MAC subheader includes instructions and/or parameters to assist an RD search for relay UEs. As an illustrative example, if Y field 470 is set to a 1, then the subheader includes instructions and/or parameters to assist an RD search for relay UEs and if Y field 470 is set to a 0, then the subheader is to be used for contention resolution.

If a legacy UE that is not interested in relay operations receives the new BI subheader, the legacy UE is not able to understand the meaning of the information included in the Y field and automatically interprets the BI included in the BI field as intended. However, if the legacy UE specifically checks if the Y field is set to "0" (which it is not) the check will fail. Even if the legacy UE ignores the message, the legacy UE would simply retry the RACH procedure because the legacy UE did not receive an expected RACH response.

Figure 5:
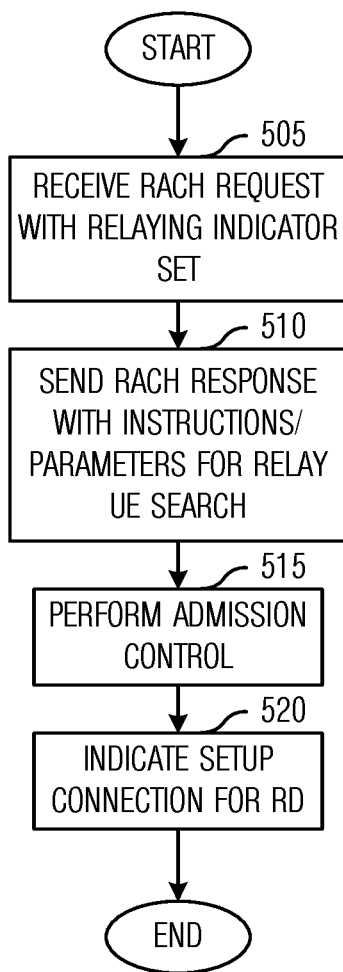
FIG. 5 illustrates a flow diagram of example operations occurring in an eNB participating in the setting up of relay operations according to example embodiments presented herein.

FIG. 5 illustrates a flow diagram of example operations 500 occurring in an eNB participating in the setting up of relay operations. Operations 500 may be indicative of operations occurring in an eNB as the eNB participates in the setting up of relay operations.

Operations 500 begin with the eNB receiving a RACH request with a relaying indicator set (block 505). The relaying indicator may be a 2 valued indicator, which when set to a first value (e.g., "1") indicates that the RD wants relaying service and when set to a second value (e.g., "0") indicates that the RD does not want relaying service. Alternatively, the RACH request includes a relaying RACH preamble which implicitly indicates that the RD wants relaying service. The eNB sends a RACH response with instructions and/or parameters to help the RD search for relay UEs (block 510). The eNB performs an admission control procedure (block 515) for the RD, which may involve authenticating and/or authorizing the RD for access to the system. The eNB indicates to the relay UE that it should set up a relay connection for the RD (block 520). The indication may include permission to use defined radio resources for the relay connection. The relay connection is established between the RD and the relay UE.

In a second aspect, the present application provides a method for establishing relay services. The method includes receiving, by an access node, a random access parameter from a RD indicating a request for relaying services, wherein the receiving of the random access parameter from the RD initiates a random access procedure, and transmitting, by the access node, a RAR including a relay indication indicating one or more candidate relay devices, wherein the transmitting of the RAR terminates the random access procedure.

According to a first embodiment of the method according to the second aspect, the method also includes selecting, by the access node, at least one candidate relay device in accordance with geographical information associated with the RD, wherein the relay indication indicates the at least one candidate relay device. According to a second embodiment of the method according to any preceding embodiment of the second aspect or the second aspect as such, the relay indication indicates at least one identifier of the one or more candidate relay devices. According to a third embodiment of the method according to any preceding embodiment of the second aspect or the second aspect as such, the method also includes assigning, by the access node, a dedicated random access preamble to the RD, wherein the random access parameter comprises the dedicated random access preamble. According to a fourth embodiment of the method according to any preceding embodiment of the second aspect or the second aspect as such, the random access parameter is received in an initial message of the random access procedure.

Figure 6:
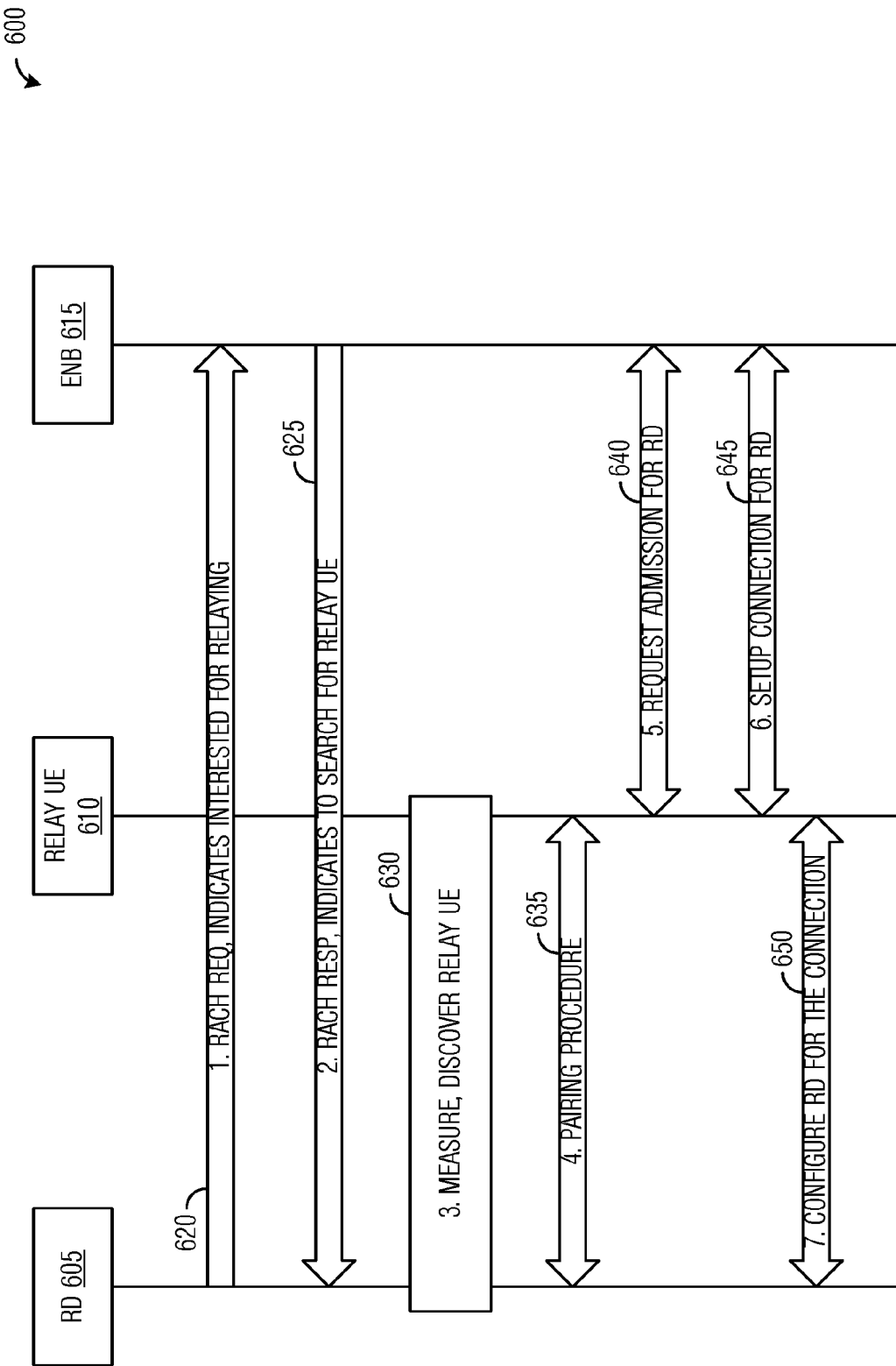
FIG. 6 illustrates a diagram highlighting messages exchanged between and processing occurring in devices in the setting up of relay operations according to example embodiments presented herein.

FIG. 6 illustrates a diagram 600 highlighting messages exchanged between and processing occurring in devices in the setting up of relay operations. Diagram 600 displays messages exchanged between and processing occurring in an RD 605, a relay UE 610, and an eNB 615.

RD 605 sends a RACH request with a relaying indicator set (event 620). The RACH request includes a RACH preamble. Alternatively, the RACH request includes a relaying RACH preamble to implicitly indicate that the RD wants relaying service. The RACH request is sent to eNB 615. eNB 615 sends a RACH response with instructions and/or parameters to help RD 605 to search for relay UEs (event 625). RD 605 searches for relay UEs in accordance with the instructions and/or parameters provided by eNB 615 (block 630). RD 605 pairs with a relay UE (event 635). If RD 605 found only one relay UE, then RD 605 pairs with the relay UE. If RD 605 found a plurality of relay UEs, then RD 605 selects a relay UE and pairs with the selected relay UE. If the pairing with the selected relay UE fails, then relay UE 605 selects another relay UE and repeats the pairing. The pairing continues until RD 605 is able to successfully pair or RD 605 has attempted to pair with all of the relay UEs. When a pairing attempt has succeeded, relay UE 610 and eNB 615 perform admission control for RD 605 (event 640). eNB 615 and relay UE 610 setup a connection for RD 605 and relay UE 610 (event 645). Relay UE 610 configures RD 605 for the relay connection (event 650).

Figure 7:
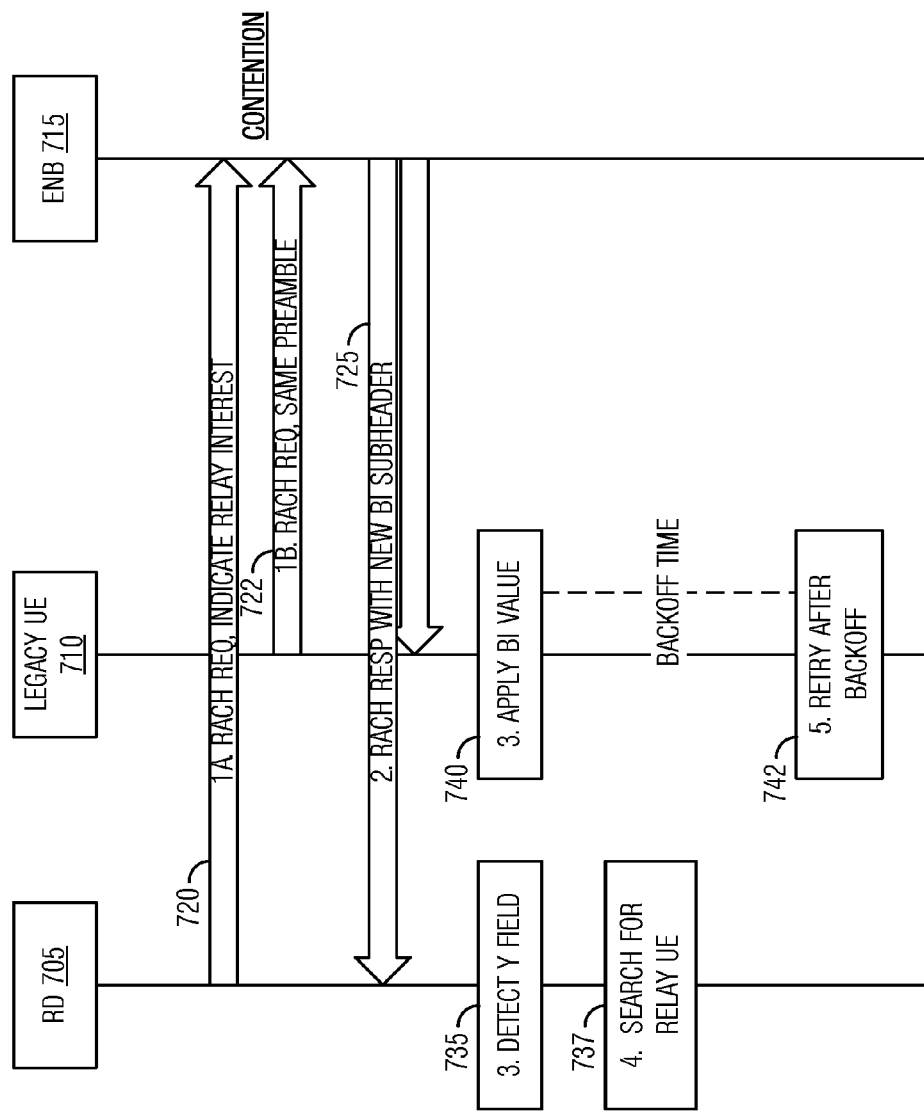
FIG. 7 illustrates a diagram highlighting messages exchanged between and processing occurring in devices in the setting up of relay operations involving a legacy UE according to example embodiments presented herein.

FIG. 7 illustrates a diagram 700 highlighting messages exchanged between and processing occurring in devices in the setting up of relay operations involving a legacy UE. Diagram 700 displays messages exchanged between and processing occurring in an RD 705, a legacy UE 710, and an eNB 715.

RD 705 sends a RACH request with a relaying indicator set (event 720). Legacy UE 710 sends a RACH request (event 722). Both RACH requests include the same RACH preamble, so there is contention. eNB 715 sends a RACH response with new BI subheader as described previously (event 725). The RACH response with the new BI subheader is received by both RD 705 and legacy UE 710. RD 705 is able to detect the Y field in the new BI subheader (block 735) and uses the information and/or parameters provided by eNB 715 to search for relay UEs (block 737). Legacy UE 710 does not detect the Y field and applies the value in the BI field (block 740) and applies the contention resolution procedure, i.e., it waits for the backoff time as indicated and retries the RACH procedure after the backoff timer expires (block 742).

Figure 8:
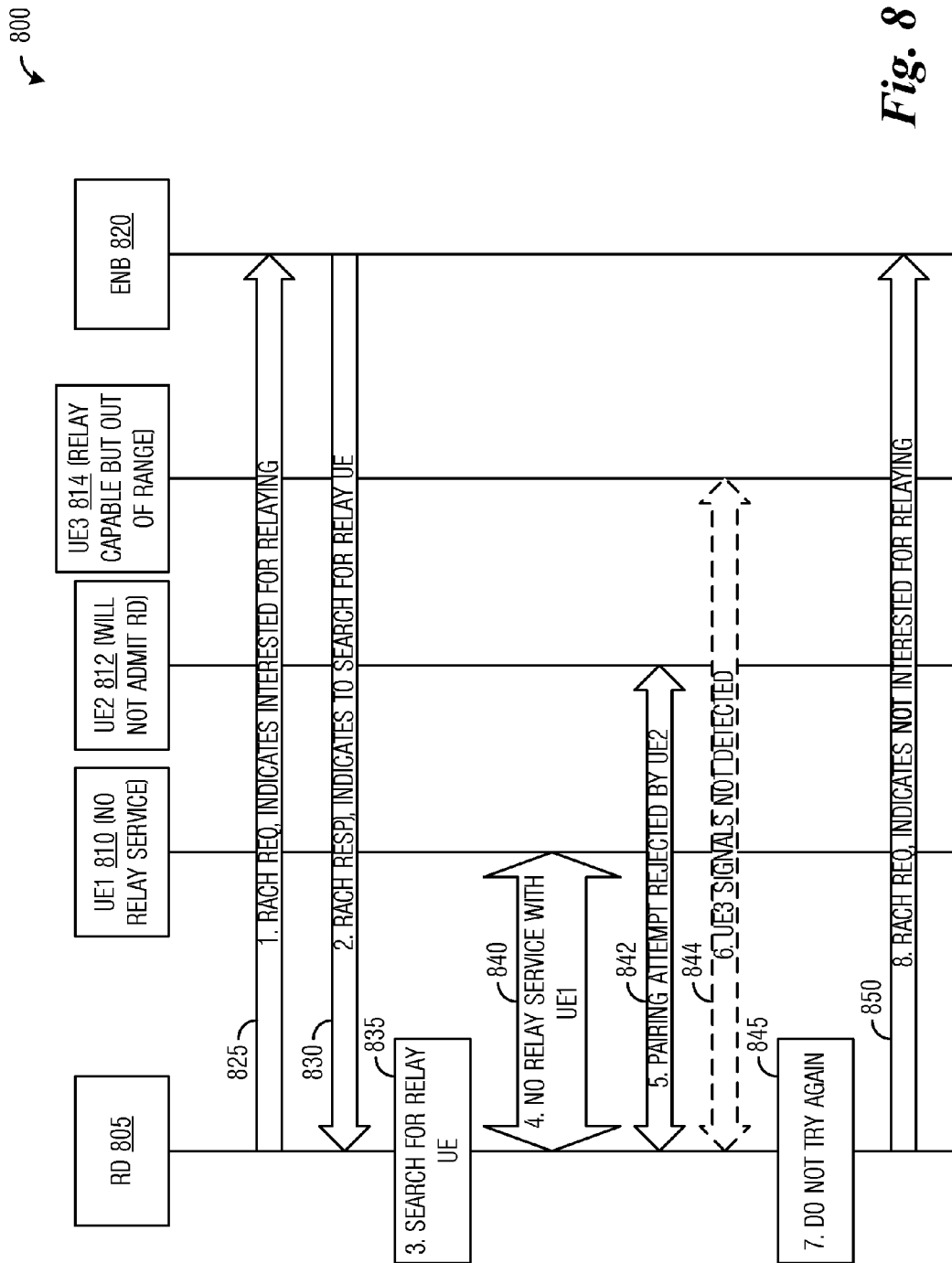
FIG. 8 illustrates a diagram highlighting messages exchanged between and processing occurring in devices in a failed setup of relay operations according to example embodiments presented herein.

FIG. 8 illustrates a diagram 800 highlighting messages exchanged between and processing occurring in devices in a failed setup of relay operations. Diagram 800 displays messages exchanged between and processing occurring in an RD 805, a relay UE1 810, a relay UE2 812, a relay UE3 814, and an eNB 820.

RD 805 sends a RACH request with a relaying indicator set (event 825). eNB 820 sends a RACH response with instructions and/or parameters to help RD 805 to search for relay UEs (event 830). RD 805 searches for relay UEs in accordance with the instructions and/or parameters provided by eNB 820 (block 835). RD 805 attempts to pair with the relay UE1 810 (event 840) but relay UE1 810 does not offer relay services. RD 805 attempts to pair with relay UE2 812 for a relaying service (event 842) but relay UE2 812 rejects RD 805. Relay UE2 812 may reject RD 805 for one or more of a wide variety of reasons, including: a subscription of relay UE2 812 does not support RD 805, the owner of relay UE2 812 rejected relay service for RD 805, RD 805 is on a black list of relay UE2 812, and so on. RD 805 is not able to detect relay UE3 814 (event 844). RD 805 determines to not try again (block 845) and sends a RACH request with a different setting (event 850). As an illustrative example, the RACH request sent by RD 805 includes the relaying indicator not set.

According to an example embodiment, the identities of one or more relay UEs are provided to the RD in the RACH response. The identities of one or more relay UEs may be provided by the eNB or another network entity and forwarded by the eNB to the RD. The identities of the one or more relay UEs can assist the RD in the search for the relay UEs. The identities of the one or more relay UEs may correspond to relay UEs that are operating in the general vicinity of the RD. As an illustrative example, the eNB or the network entity is able to determine geographical information of the RD (such as an approximate location, or direction of arrival of a transmission of the RD, orientation of the RD, cell where the RD is located, timing estimate, pathloss estimate, and so on) and select the one or more relay UEs based on the geographical information. Knowing the identities can help simplify the search for relay UEs by the RD, by helping to shrink the search space for example. As an illustrative example, the RD may detect the proximity of the relay UE through reference signals whose configuration depends on the identity of the relay UE, so knowing the identity of the relay UE may allow the RD to perform a targeted search for the reference signal configurations corresponding to the identities it received from the eNB.

Figure 9:
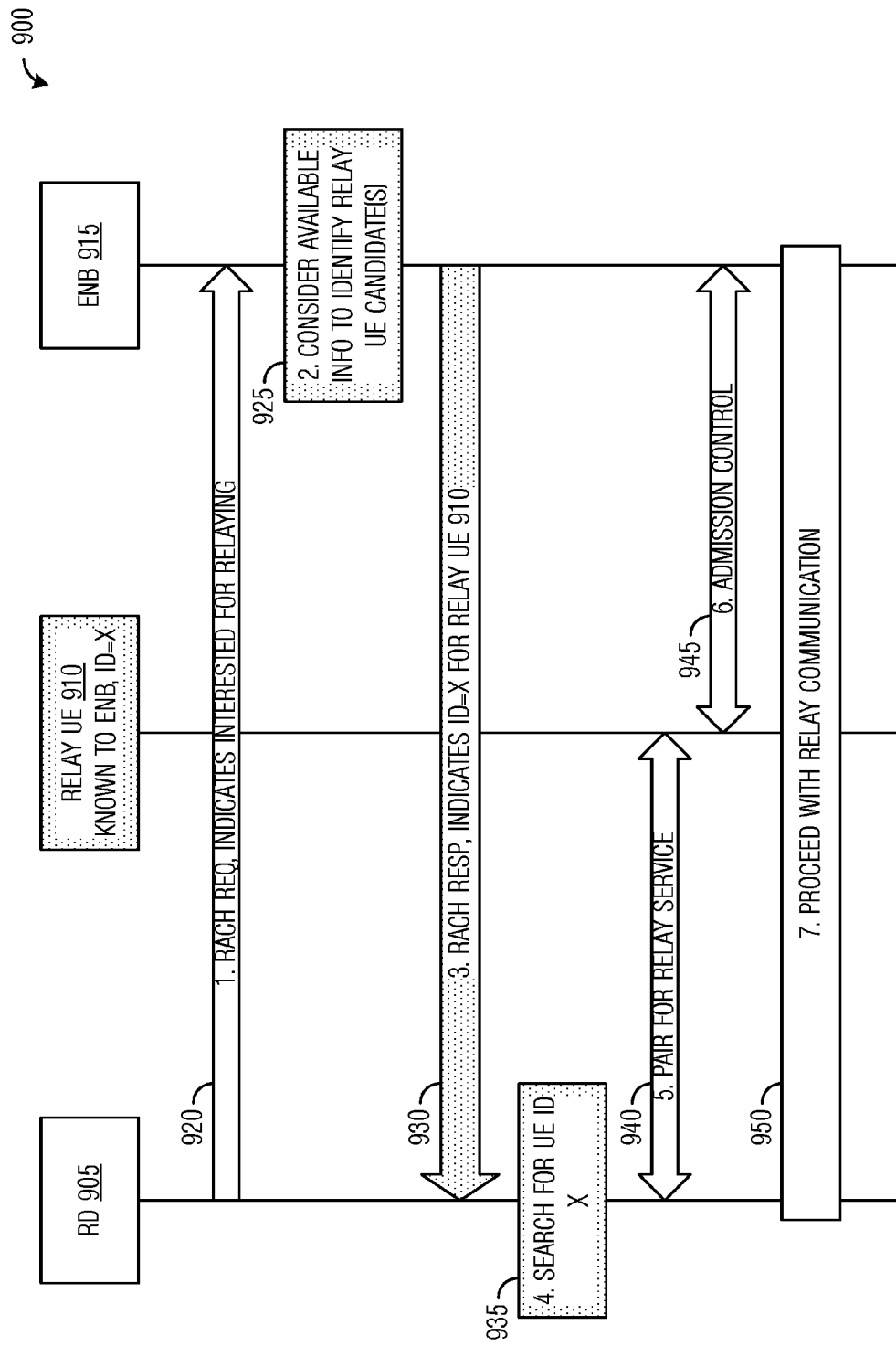
FIG. 9 illustrates a diagram highlighting messages exchanged between and processing occurring in devices in the setting up of relay operations utilizing identities provided by an eNB according to example embodiments presented herein.

FIG. 9 illustrates a diagram 900 highlighting messages exchanged between and processing occurring in devices in the setting up of relay operations utilizing identities provided by an eNB. Diagram 900 displays messages exchanged between and processing occurring in an RD 905, a relay UE 910, and an eNB 915. Relay UE 910 has an associated identifier X.

RD 905 sends a RACH request with a relaying indicator set (event 920). The RACH request is sent to eNB 915. eNB 915 considers available information to identify relay UE candidates (block 925). As an example, eNB 915 considers geographical information of the UE, such as approximate location, direction of arrival of the RACH request, orientation of RD 905, cell where RD 905 is located, timing estimate, pathloss estimate, and so on, to select candidate relay UEs that may serve RD 905. eNB 915 sends a RACH response with instructions and/or parameters to help RD 905 to search for relay UEs (event 930). The instructions and/or parameters include the identifiers of the candidate relay UEs selected by eNB 915, e.g., the instructions and/or parameters include identifier X. The identifiers of the candidate relay UEs may be actual UE identifiers, such as temporary mobile subscriber identities (TMSI), or an expression that will allow RD 905 to search for advertised services provided by the candidate relay UEs. The candidate relay UEs identified by eNB 915 are not required to pair with RD 905. However, RD 905 still knows that the candidate relay UEs are UEs that provide relay services. RD 905 searches for relay UEs in accordance with the instructions and/or parameters provided by eNB 915 (block 935). RD 905 pairs with a relay UE (event 940). Relay UE 910 and eNB 915 perform admission control for RD 905 (event 945). RD 905, relay UE 910, and eNB 915 proceed with relay communications (event 950).

Figure 10:
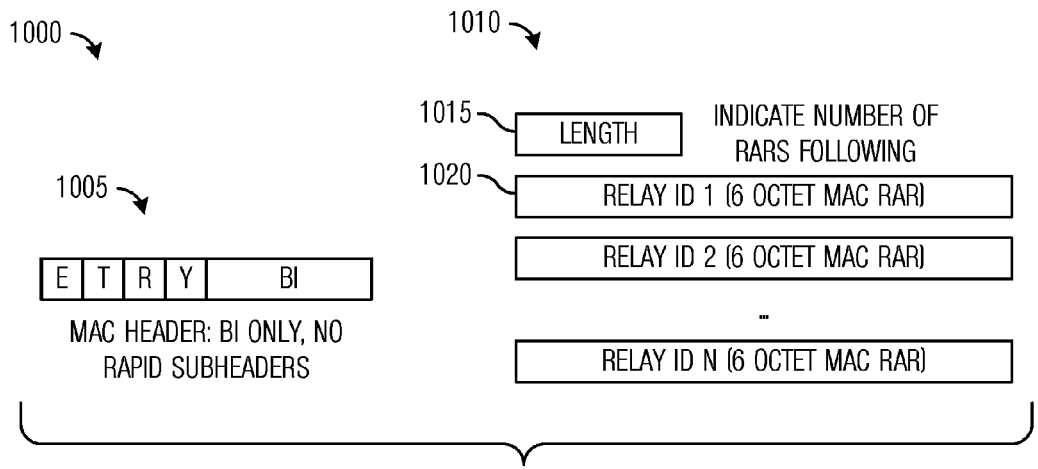
FIG. 10 illustrates an example message format of a RACH response according to example embodiments presented herein.

FIG. 10 illustrates an example message format of a RACH response 1000. RACH response 1000 includes a new BI subheader 1005, as described previously. Also included is an identifier portion 1010, which includes a length field 1015 with a value indicating a number of identifiers to follow, and one or more identifier fields (such as identifier field 1020) with each identifier field comprising an identifier of a candidate relay UE. As an illustrative example, an identifier field may be 6 octets long. As an alternative, each new BI subheader is followed by a single identifier field. Therefore, if there is a plurality of candidate relay UEs, the eNB signals a new BI subheader and an identifier field for each candidate relay UE in the plurality of candidate relay UEs.

If the RD has been previously connected to the eNB, the eNB may have been able to provide the RD, during the previous connection, with a dedicated RACH preamble for subsequent use in the event that the RD requests relaying service. Then, when the RD decides to search for a relay UE, the RD sends a RACH request with the dedicated RACH preamble. Since the eNB knows that the dedicated RACH preamble is associated with the RD, the RACH procedure is contention free. Being contention free allows the eNB to know the identity of the RD requesting the relay service and the eNB may make use of the identity of the RD when identifying candidate relay UEs. The dedicated RACH preamble may be valid in more than one cell. The validity of the dedicated RACH preamble may be known in the multiple cells of a single eNB. Furthermore, coordination between multiple eNBs can be used to increase the number of cells where the dedicated RACH preamble is valid. As an illustrative example, the eNB indicates to the RD when the dedicated RACH preamble is assigned, the indication includes a list of cells where the dedicated RACH preamble is valid or a group identifier of cells where the dedicated RACH preamble is valid. A group identifier of cells may represent a tracking area or another group of cells in which the RD may be expected to perform mobility procedures with no signaling or with minimal signaling. If the RD moves beyond the cells included in the group identifier, it may connect to the network in the course of a mobility procedure, e.g., a handover or a tracking area update. Such a procedure may provide an opportunity for assignment of a new dedicated RACH preamble. Alternatively, the RD may forgo using the dedicated RACH preamble to request relaying if it finds itself outside the group of cells where the preamble is valid.

In a third aspect, the present application provides a RD. The RD includes one or more processors, and a computer readable storage medium storing programming for execution by the one or more processors. The programming including instructions to configure the RD to transmit a random access parameter to a network node indicating a request for relaying services, wherein the transmitting of the random access parameter initiates a first random access procedure, receive a RAR including a relay indicator indicating one or more candidate relay devices, wherein receiving the relay indicator terminates the first random access procedure, and search for a relay device in accordance with the relay indicator included in the RAR.

According to a first embodiment of the RD according to the third aspect, the RD includes instructions to configure the RD to initiate a second random access procedure to request a direct connection with the network node when the searching for the relay device fails. According to a second embodiment of the transmitting device according to any preceding embodiment of the third aspect or the third aspect as such, the relay indicator comprises an indicator of a number of candidate relay devices and identifiers associated with the candidate relay devices. According to a third embodiment of the transmitting device according to any preceding embodiment of the third aspect or the third aspect as such, the random access parameter is transmitted in an initial message of the first random access procedure.

In a fourth aspect, the present application provides an access node. The access node includes one or more processors, and a computer readable storage medium storing programming for execution by the one or more processors. The programming including instructions to configure the access node to receive a random access parameter from a RD indicating a request for relaying services, wherein the receiving of the random access parameter from the RD initiates a random access procedure, and transmit a RAR including a relay indication indicating one or more candidate relay devices, wherein the transmitting of the RAR terminates the random access procedure.

According to a first embodiment of the access node according to the fourth aspect, the RD includes instructions to configure the access node to select at least one candidate relay device in accordance with geographical information associated with the RD, wherein the relay indication indicates the at least one candidate relay device. According to a second embodiment of the access node according to any preceding embodiment of the fourth aspect or the fourth aspect as such, the RD includes instructions to configure the access node to assign a dedicated random access preamble to the RD, wherein the random access parameter comprises the dedicated random access preamble. According to a third embodiment of the access node according to any preceding embodiment of the fourth aspect or the fourth aspect as such, the random access parameter is received in an initial message of the random access procedure.

Figure 11:
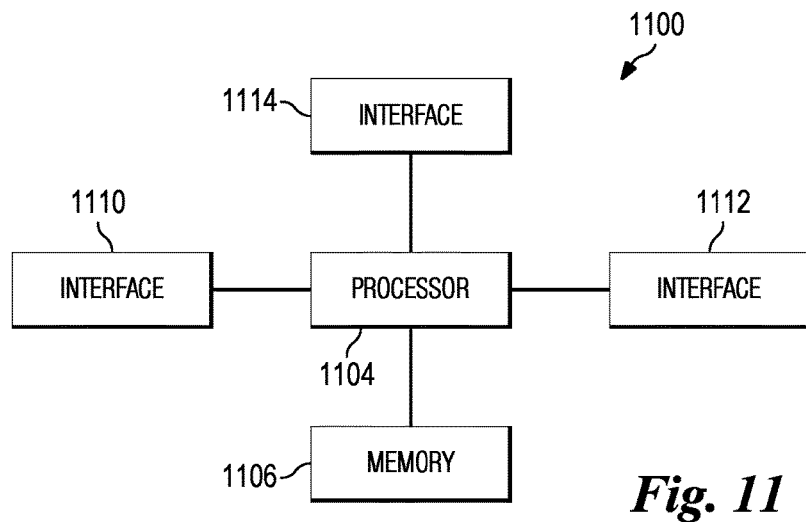
FIG. 11 illustrates a block diagram of an embodiment processing system for performing methods described herein according to example embodiments presented herein.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
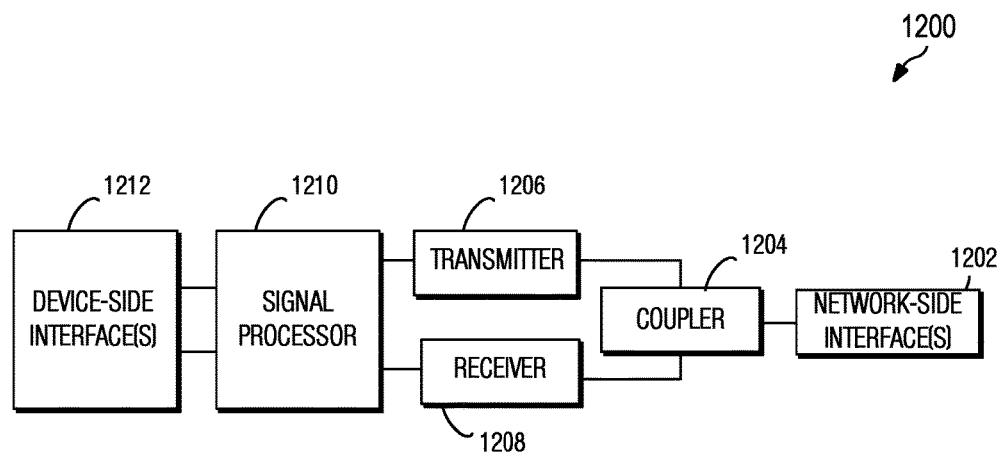
FIG. 12 illustrates a block diagram of a transceiver adapted to transmit and receive signaling over a telecommunications network according to example embodiments presented herein.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a searching unit/module, a selecting unit/module, an initiating unit/module, and/or an assigning unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method comprising:
    transmitting, by a remote device (RD), a random access parameter to a network node indicating a request for relaying services, the transmitting of the random access parameter initiating a first contention-based random access procedure;
    receiving, by the RD, a random access response (RAR) including a relay indicator indicating one or more candidate relay devices, the receiving the relay indicator terminating the first contention-based random access procedure; and
    searching, by the RD, for a relay device in accordance with the relay indicator included in the RAR.

2. The method of claim 1, further comprising initiating, by the RD, a second random access procedure to request a direct connection with the network node when the searching for the relay device fails.

3. The method of claim 1, wherein the relay indicator comprises an indicator of a number of the one or more candidate relay devices and identifiers associated with the one or more candidate relay devices.

4. The method of claim 1, wherein the random access parameter is transmitted in an initial message of the first contention-based random access procedure.

5. The method of claim 1, wherein the random access parameter is a random access preamble.

6. The method of claim 5, wherein the random access preamble is selected from a plurality of relaying random access preambles.

7. A method comprising:
    receiving, by an access node, a random access parameter from a remote device (RD) indicating a request for relaying services, the receiving of the random access parameter from the RD initiating a contention-based random access procedure; and
    transmitting, by the access node, a random access response (RAR) including a relay indication indicating one or more candidate relay devices, the transmitting of the RAR terminating the contention-based random access procedure.

8. The method of claim 7, further comprising selecting, by the access node, at least one candidate relay device in accordance with geographical information associated with the RD, wherein the relay indication indicates the at least one candidate relay device.

9. The method of claim 8, wherein the relay indication indicates at least one identifier of the one or more candidate relay devices.

10. The method of claim 7, wherein the random access parameter is received in an initial message of the contention-based random access procedure.

11. The method of claim 7, wherein the relay indication includes a medium access control (MAC) backoff indicator (BI) subheader with a relay field set to a first value.

12. A remote device (RD) comprising:
    a non-transitory memory storage comprising instructions; and
    one or more processors in communication with the non-transitory memory storage, wherein the one or more processors execute the instructions to:
        transmit a random access parameter to a network node indicating a request for relaying services, wherein the transmitting of the random access parameter initiates a first contention-based random access procedure,
        receive a random access response (RAR) including a relay indicator indicating one or more candidate relay devices, wherein receiving the relay indicator terminates the first contention-based random access procedure, and
        search for a relay device in accordance with the relay indicator included in the RAR.

13. The RD of claim 12, wherein the one or more processors execute the instructions to initiate a second random access procedure to request a direct connection with the network node when the searching for the relay device fails.

14. The RD of claim 12, wherein the relay indicator comprises an indicator of a number of the one or more candidate relay devices and identifiers associated with the one or more candidate relay devices.

15. The RD of claim 12, wherein the random access parameter is transmitted in an initial message of the first contention-based random access procedure.

16. An access node comprising:
    a non-transitory memory storage comprising instructions; and
    one or more processors in communication with the non-transitory memory storage, wherein the one or more processors execute the instructions to:
        receive a random access parameter from a remote device (RD) indicating a request for relaying services, wherein the receiving of the random access parameter from the RD initiates a contention-based random access procedure, and
        transmit a random access response (RAR) including a relay indication indicating one or more candidate relay devices, wherein the transmitting of the RAR terminates the contention-based random access procedure.

17. The access node of claim 16, wherein the one or more processors execute the instructions to select at least one candidate relay device in accordance with geographical information associated with the RD, wherein the relay indication indicates the at least one candidate relay device.

18. The access node of claim 16, wherein the random access parameter is received in an initial message of the contention-based random access procedure.

* * * * *